United States Patent [19]
Meyzonnetie et al.

[11] Patent Number: 5,485,009
[45] Date of Patent: Jan. 16, 1996

[54] LASER IMAGING SYSTEM WITH A LINEAR DETECTOR ARRAY

[75] Inventors: Jean L. Meyzonnetie, Jouy en Josas; Bertrand Remy, Meudon la Foret, both of France

[73] Assignee: Thomson - CSF, Paris, France

[21] Appl. No.: 92,776

[22] Filed: Aug. 25, 1987

[30] Foreign Application Priority Data

Sep. 16, 1986 [FR] France .................................. 86 12939

[51] Int. Cl.⁶ ............................. G01C 3/08; G01B 11/26; H04N 3/12
[52] U.S. Cl. ..................... 356/5.09; 250/208.1; 250/330; 250/332; 250/334; 348/166; 348/332; 356/141.1
[58] Field of Search ............................... 356/5, 28.5, 141, 356/152, 5.09, 141.1; 250/330, 208.1, 332, 334; 348/166, 332

[56] References Cited

U.S. PATENT DOCUMENTS

| | | | |
|---|---|---|---|
| 4,167,329 | 9/1979 | Jelalian et al. ............................. | 356/5 |
| 4,185,919 | 1/1980 | Williamson et al. .................... | 356/141 |
| 4,311,385 | 1/1982 | Keene ...................................... | 356/152 |
| 4,380,391 | 4/1983 | Buser et al. ............................... | 356/5 |
| 4,514,084 | 4/1985 | Makino et al. ............................ | 356/4 |
| 4,518,256 | 5/1985 | Schwartz .................................... | 356/5 |
| 4,634,272 | 1/1987 | Endo ........................................... | 356/5 |

Primary Examiner—Stephen C. Buczinski
Attorney, Agent, or Firm—Cushman Darby & Cushman

[57] ABSTRACT

Laser active imaging system allowing in particular to use a wide field by means of a detecting device including a linear array of N juxtaposed photodetector elements oriented along the direction of scanning and associated with a focusing lens. The receiver includes a circuitry receiving the N detected channels and is equipped with compensation circuits for the time shift exhibited by the video signals as a function of the distance so as to bring the illuminated objects back to their angular location for the display of the observed field. The processing circuits include circuits for measuring the amplitude and the Doppler shift and for identification of the distance through the rank of the detection channel.

7 Claims, 5 Drawing Sheets

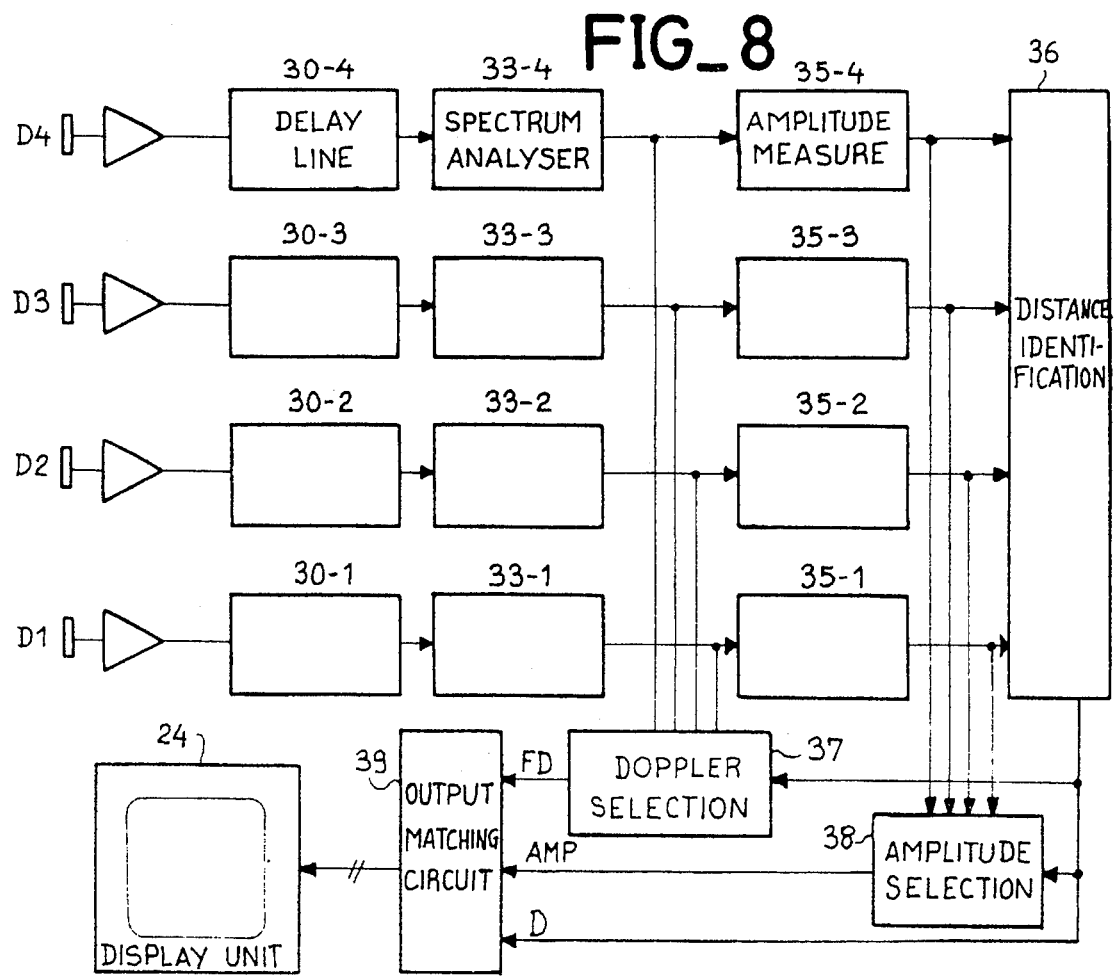
FIG_8

LASER IMAGING SYSTEM WITH A LINEAR DETECTOR ARRAY

BACKGROUND OF THE INVENTION

1. Field of the Invention

The present invention relates to an active laser imaging system using a linear detector array (also called "line-scan array"). This system allows to observe a wide field and can, for example be used as an aid to the control of an aircraft by permitting a display of the ground located in front of the vehicle.

2. Description of the Prior Art

In a laser imaging system, the illuminator transmits a beam with a low divergence, of the order of $10^{-3}$ radian in general, that illuminates a portion of the scene. The backscattered flux is collected by a receiving unit generally equipped with a single detector and whose field of view is matched to and of the same order of magnitude as that of the illuminator.

The system is equipped with an opto-mechanical scanning device that moves angularly and by one and the same value the direction pointed to by the illuminator and that pointed to by the receiving unit so as to cover point by point the desired scanning field. The detected signal is processed and then applied, for example, to a display device that reconstructs point by point the image of the scanned zone of space. Here the image can be different from the conventional television pictures and represent characteristics of the scene such as Doppler velocity of each point, or relief, or the display of obstacles, etc.

The field characteristics of these laser imaging systems can differ but the invention relates in particular to an application with a wide field, typically a few tens of degrees. The overlap can be only partial so as to define, for example, a meshing in the field, or alternatively to scan only a small number of lines (line-scan technique).

The utilization of these imaging systems reveals a detection problem related to the scanning angular velocity w and the distance D of the illuminated target. The laser flux transmitted by the illuminator propagates at the velocity of light c toward a point of the target; the same is true for the laser radiation backscattered toward the detector of the receiving unit. The direction pointed to by the receiving unit, at the time it receives the flux, no longer coincides with the direction pointed to by the illuminating system at the time of start of the pulse.

This angular shift $\Delta\alpha$ is variable with the distance of the point which is pointed to and the instantaneous angular velocity of scanning. Note precisely, this shift is given by the relation:

$$\Delta\alpha = w.2(D/c)$$

In the French patent application FR-A-2 568 688, there is described a method for remedying these disadvantages by providing the imager with adjustable optical deflection means allowing to produce a predetermined relative angular shift between the pointing directions of the illuminator and the receiver so as to compensate for the scanning rotation $\Delta\alpha$ that occurs during the to and fro travel of the laser luminous flux.

This technique is well adapted to the cases where the distances of the various points of the field to the imager are little different from each other. As a matter of fact, the correction is perfect only for a given mean adjustment distance and remains sufficient in a limited distance interval that cannot exceed a few hundred meters.

In the case of a control system with a wide field, the distances of the various points illuminated during a scan are very variable, for example from a few hundred meters to a few kilometers. Moreover, the requirement for a wide field usually leads to increase the angular velocity of scanning, which makes the correction still more sensitive to distance. As a matter of fact, if $\theta$ is the instantaneous angular field (zone of space seen by a photodetector of the receiver), the correction is sufficient for a distance interval $\Delta D$ only if we have the relation:

$$w.(2/c).\Delta D < \theta \text{ or } \Delta D < \theta.c/2w$$

which means that the transmission-reception angular shift must remain smaller than the instantaneous field $\theta$ of the receiver. As a concrete example, we shall assume that the angular scanning speed w is such that the beam transmitted by the illuminator moves angularly by an angle $\theta$ in 5 microseconds. The distance interval for which the correction described in the above-mentioned patent application remains sufficient is therefore only of:

$$\Delta D = (c/2).5 \times 10^{-6}, \text{ that is } 750 \text{ m.}$$

This sufficient interval in the case of a small-field imager (small differences in depth of the various points of the field) is no longer sufficient in the case of a control system, when obstacles may appear suddenly at very variable distances and in a wider field.

SUMMARY OF THE INVENTION

An object of the invention is to remedy these disadvantages by providing the laser imager with a receiver that includes, for the detection, in place of a single photodetector element, a linear array of closely spaced photodetector elements to ensure a quasi-continuous coverage of the observed field, this linear array being oriented parallel to the direction of scanning so that the rank of the photodetector element excited by a laser radiation backscattered by an illuminated object, indicates approximately the distance of the object that has sent this radiation back.

According to the invention, it is proposed to achieve a laser imaging system grouping a laser illuminator to transmit a light beam along a pointing direction, a receiver with a detecting device for the detection of the laser radiation returned by the illuminated objects, a device for channel separation and for scanning to direct, toward the detector device, the backscattered radiation and to move, in angular rotation, the transmission beam so as to scan a predetermined field, and a device for displaying the detected video image corresponding to said field, the system being characterized by the fact that the detecting device includes a linear array of N juxtaposed elements, oriented along the direction of scanning and associated with a focusing lens so as to detect the objects in a distance interval comprising N successive elemental intervals, the rank of an element identifying a corresponding elemental interval, the receiver including an electronic circuitry receiving the N detection channels and being equipped with circuits for identification of distance through the rank of the detection channel, as well as compensation circuits for the time shift exhibited by the video signals as a function of distance so as to bring the illuminated objects back to their correct angular location for the display of the observed field.

BRIEF DESCRIPTION OF THE DRAWINGS

The characteristics and advantages of the present invention will appear more clearly from the following detailed description given with reference to the accompanying drawings, in which:

FIG. 8 is a diagram of a preferred embodiment of the reception circuits.

DETAILED DESCRIPTION OF THE DRAWINGS

Figure 1:
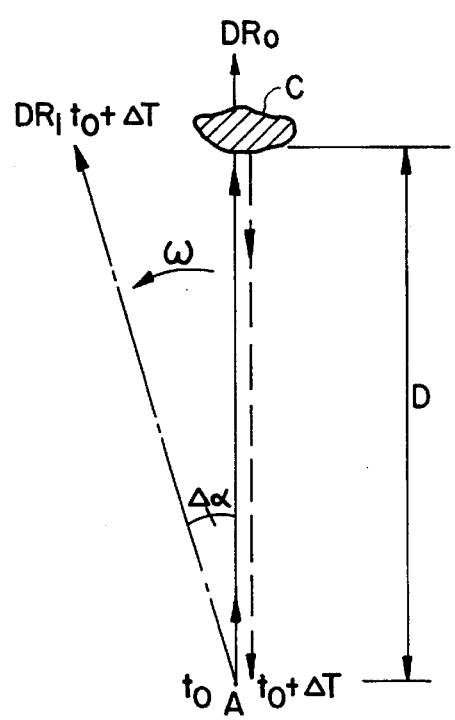
FIGS. 1 to 4 are schematics related to the problem to be solved and to the chosen solution.
Figure 2:
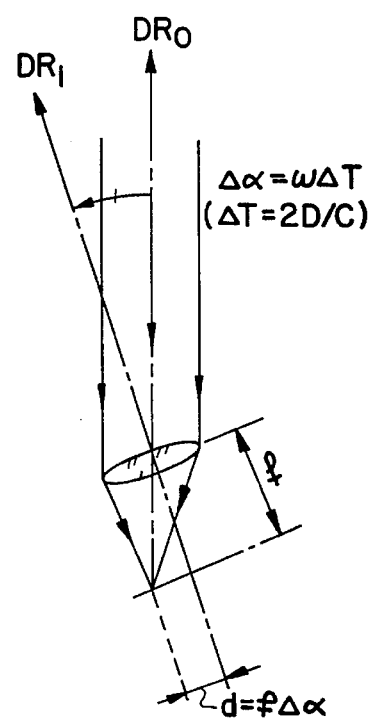

FIG. 1 shows the to and fro path of the laser radiation transmitted from a point A and returned along the same direction by the illuminated target C. Due to the high value of the velocity of light, we can assume that during the time interval $\Delta T$ separating the transmission from the reception, the transmitter-receiver; system remains located in A. As an example, for a target located at a distance D equal to 3 km, the interval $\Delta T$ is 20 microseconds and, even when considering the airborne system, the displacement of point A is negligible. On the other hand, the rotation $\Delta \alpha$ occuring during $\Delta T$ must be taken into account because this rotation of the transmitter and receiver axes, that normally are parallel, must remain limited to avoid that the flux received from the target C is focused out of the photosensitive surface of the detector as this is shown in FIG. 2. In this Figure, $DR_0$ is the initial pointing direction of the system at the transmission initial time $t_0$ and $DR_1$ is the direction at the time $t_1 = t_0 + \Delta T$.

Figure 3:
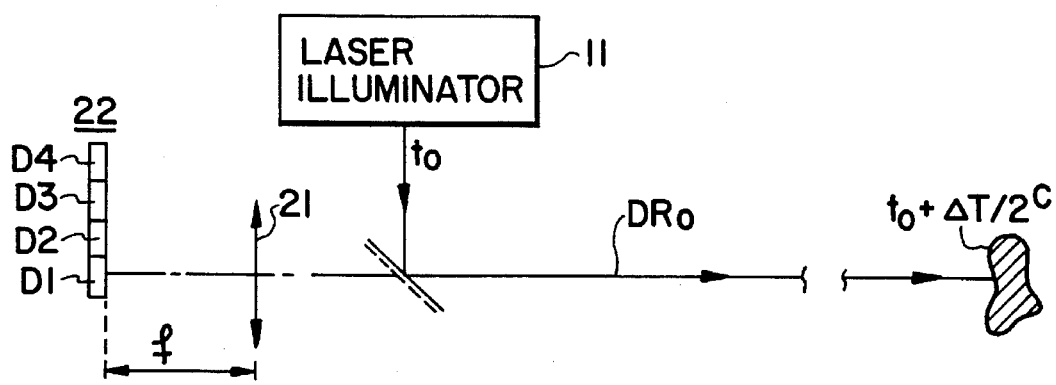
Figure 4:
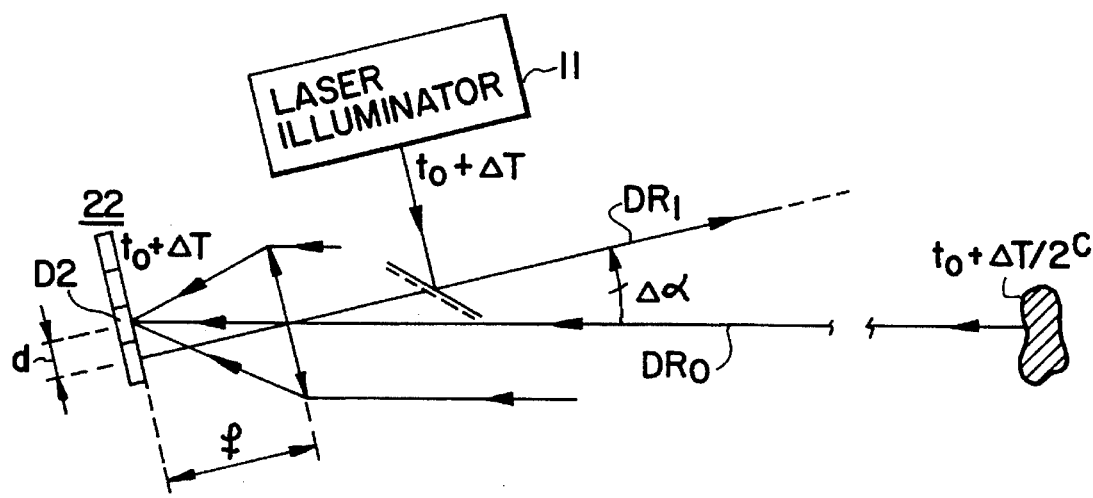

In order to remedy these constraints, there are reproduced, according to the present invention, conditions of detection that are those shown in FIGS. 3 and 4. Depending on the distance from the imager to each illuminated object point, the field and the instantaneous angular scanning speed w, the angular transmission-reception shift results in the return spot focused in the plane of the photodetectors (the instantaneous size of this spot corresponds approximately, in the so-called matched heterodyne detection to the photosensitive surface exhibited by a photodetector) falling more or less far from the point materializing the direction of transmission. The linear detector array is aligned parallel to the direction of the most rapid scanning (line horizontal scanning in the case of a line-by-line scanning, this line scanning being shown in the plane of the Figure). The transmission-reception angular shift $\Delta \alpha$ is also found linearly at the focus of the receiving lens of focal length f in the form of a shift d with respect to the optical axis, with the value:

$$d = f.\Delta\alpha = f.w.2(D/c)$$

This shift results in the spot corresponding to the optical signal being focused at a point of the linear array, hence on a photodetector element, that will depend on the distance of the illuminated point.

FIG. 3 illustrates the initial situation at the transmission time $t_0$ of the laser illuminator 11. The linear array 22 is composed of a number N of elements, with N=4 in this example. These elements D1 to D4 are juxtaposed along the direction of scanning Lying in the plane of the Figure, a first element D1 being located here on the optical axis so as to detect the close targets, and the elements D2, D3, D4 to detect the more and more distant targets. FIG. 4 shows, at time $t_1 = t_0 + \Delta T$ of reception of the signal reflected by the object C, the change of position of the unit resulting from the scanning $\Delta\alpha$ occuring during this time interval $\Delta T$ for the to and fro travel of the light wave. For the distance D shown, the flux is detected by the element D2. It will be appreciated that the number of elements determines the distance resolution of the system; however, this number of elements cannot be any as it is also related to the size of the spot produced by an illuminated object point. This number also depends on the speed w of the line scanning and on the value of the instantaneous field $\theta$, and it defines the maximum distance i.e., the range of the system. It can be, for example, from 5 to 10. The maximum distance is given by $N \Delta D$, the factor $\Delta D$ being the distance increment, or elemental interval of distance, covered by a photodetector element, this value of maximum distance being equal to $N.(c/2).(\theta/w)$.

The evaluation of the distance of each point is done by determining the rank of the photodetector element that receives the flux, hence the rank of the electronic channel of detection and processing where the signal amplitude is the greatest. The image spot can overlap two photodetector elements. In such a case, to increase the precision of measurement, a weighting is made between the two adjacent photodetector elements according to known techniques.

The system applies, for example, to the case where the laser illuminator is of the continuous type, the so-called CW type, delivering a non-interrupted wave, and where each reception channel performs a spectral analysis of the electrical signal supplied by the photodetector element to which it is connected. This allows to display the approaching or receding velocities along the line going from the imager to the illuminated point, by measuring the frequency shift through Doppler effect, at each point of the field, as well as the approximative distance of the various points (with a precision that can be of a few hundred meters, which is sufficient for certain applications, for example the aid to aircraft control).

The display of the information supplied by such a system reveals a problem as it is impossible to determine the angular position of a point with respect to the imager, whose spatial position is assumed to have not changed significantly during the to and fro time of the flux, which is true in general, by means of the only information on the angular position of the pointing line defined by the direction $DR_1$ of scanning at the time of reception of the signal previously transmitted. As a matter of fact, the direction of the illuminated point is given by that of the transmission axis $DR_0$ at the transmission time $t_0$, equal to the reception time $t_1$ less the to and fro time $\Delta T$ of the flux, and not by the direction $DR_1$ of the receiving unit at the time where this flux is received. If one does not take into account this phenomenon, related to the distance D of the illuminated point to the imager, the points of the displayed image exhibit an error that can amount to several resolution points in the direction of the line scanning.

Figure 5:
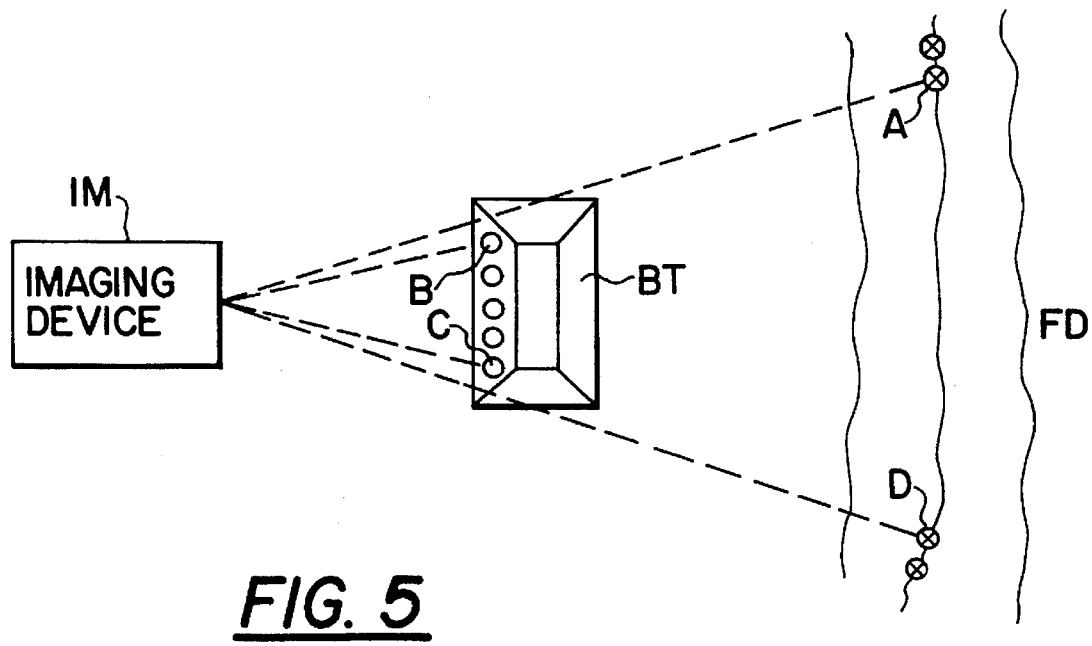
FIGS. 5 and 6 are schematics relating to the problem of the angular shift of the displayed signals as a function of the difference of distance of the illuminated points.
Figure 6:
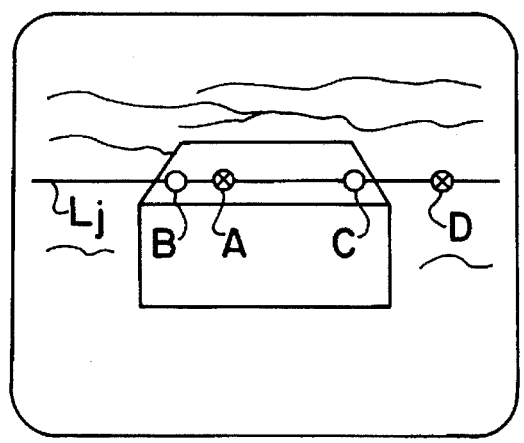

This phenomenon is illustrated in FIGS. 5 and 6 where there is shown the particular case of a building BT that appears on a background FD much more distant, the line scanning being in the plane of the Figure, for example horizontal. The scanning beam transmitted by the imager IM begins to scan the points located on the background FD up to the point A located just on the edge and behind the building. Then, the beam goes through the points B to C of the building, much closer to the imager than the background FD, and finally goes back to the background FD (points D and the following ones). The flux that travels to and from the background FD (points A and D) takes more time than in the case of the points B to C of the building BT. If the difference is sufficiently great, the optical signal from the point A arrives at the receiver much after that coming from point 8. Point A is, therefore, represented on the display (FIG. 6) after point B on the corresponding scanning line $L_j$. There is, consequently, superimposition of a point of the background FD on a point of the building BT on the display. Likewise, point D is seen by the receiver 2 much after point C, which produces a hole in the line after the outer edge of the building BT after point C because the receiver no longer receives any signal during a time corresponding to the difference between the two to and fro times of the light (points C and D).

To remedy this disadvantage that causes a shifted representation of the objects as a function of their spread in depth, the imaging system is equipped with reception circuits compensating for the time shift exhibited by the received signals as a function of distance, in order to bring the illuminated objects back to their correct angular location and display the objects at their normal location in the observed field.

Figure 7:
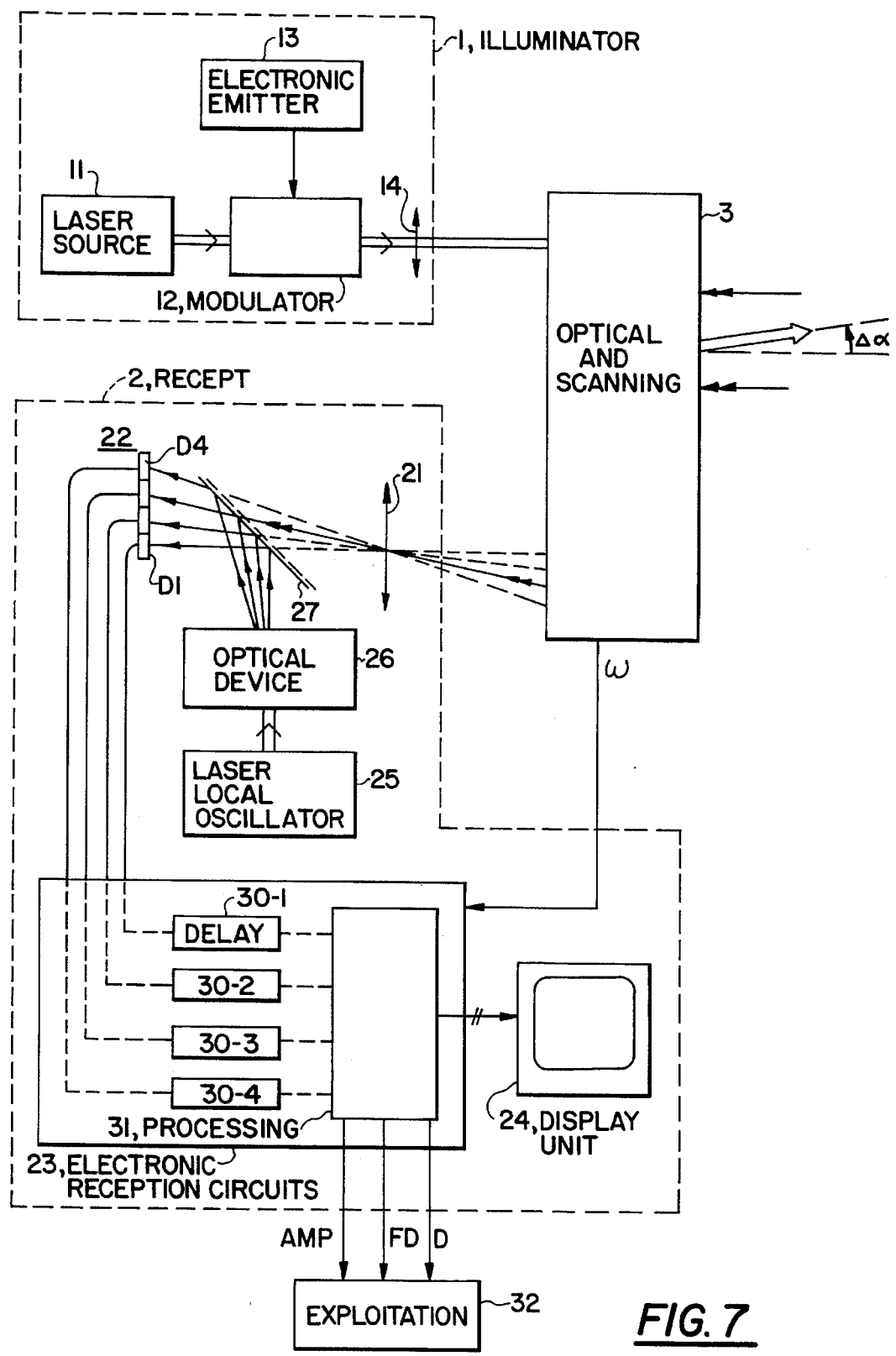
FIG. 7 is a block diagram of a laser imaging system with a wide field according to the present invention.

FIG. 7 is a block diagram in which there is shown the light transmitter called "illuminator" 1 that produces the laser beam whose axis represents the pointing direction of the system, and a receiver 2 whose reception optical axis is oriented in the same manner. A device 3 performs the optical separation of the transmission and reception beams and the desired linear or two-dimensional scanning to cover the field to scan.

The distance parameter D is measured at reception, as well as, possibly, the velocity through the Doppler shift FD. The angular speed of scanning w is measured by a sensor 3.

The transmitter unit 1 and the receiver unit 2 are generally made of the illustrated main elements. These means are, for the illuminator: a laser 11 that delivers a continuous or pulsed wave; a modulator 12 that performs the desired modulation, for example a temporal modulation by chopping the continuous beam to light pulses and/or a frequency modulation, upon reception of the corresponding signals; electronic circuits 13 to generate the modulation control signals; an output lens 14 to obtain the desired diameter and divergence of the transmitted beam.

For the receiver 2, the main means consist of: an input lens 21 to focus the received backscattered laser radiation; a linear detector array 22 to detect the focused radiation; processing electronic circuits 23 to produce in particular the video signals for image reconstruction; a device 24 for image display or storage. The circuitry 21 to 24 corresponds to a non-coherent reception; in the case of a coherent or heterodyne detection as shown, the detecting device 22 further receives a local wave from an oscillator 25 locked to the transmission frequency or representing this frequency, or alternatively the local wave is obtained directly by tapping a fraction of the transmitted beam in a known manner.

In addition, a divergent optical device allows to illuminate simultaneously: the N detector elements (D1 to D4) from the beating local laser wave. This optical device can comprise, as shown, a lens 26 generating N optical beams, angularly shifted, and a mirror 27, partially transparent to reflect the N shifted beams toward the N photodetector elements.

The above-mentioned units 1 and 2 are present in most laser range-finders, with the exception of the image display 24 and the elements 22, 26, 27; circuits 23 perform the measurements of the distance D and, possibly, of the Doppler shift FD. A system of this sort is described in particular in the French patent 2 519 771 covering a lidar with pulse compression where the modulation unit 12, 13 is arranged so as to produce periodically two pulses linearly modulated in frequency (chirp pulses). To deliver these pulses periodically, the modulator 12 is advantageously made up of two acousto-optical modulators connected in an antiparallel arrangement.

The time shift compensation circuits are represented by the delay circuits 30-1 to 30-4 inserted in the corresponding detection channels. These circuits allow to delay the corresponding detected electronic signals from the photodetector elements D1 to D4, the delay being different for each channel and the delay difference between two channels being equal to the time necessary to scan the angle made by the directions of the two corresponding detectors. The detector located closest to the reception axis (with the same direction as the transmission axis) is that to which corresponds the maximum delay. These circuits allow, therefore, to delay the signals form the closest illuminated objects for them to be then processed approximately at the same time as the signals from the most distant targets.

According to a further embodiment, the time shift compensation circuits can be obtained with an image memory in which, for each illuminated point, the distance, Doppler shift and amplitude information is stored, and whose addressing is predetermined to shift the image points in the direction of the line scanning as a function of their respective distance in order to correct the resulting display The laser illuminator 1 can include a unit for optical frequency translation to obtain a superheterodyne reception, and this frequency translation can be performed in other cases by the relative motion of the ground with respect to the imager, in particular when the latter is mounted in an aircraft. The illuminator 1 delivers a laser beam with a low divergence of about $10^{-4}$ to $10^{-3}$ radians, whose wavelength can be of about 10.6 microns in the case of a $CO_2$ gas laser. The laser flux can be continuous or pulsed. The scanning system 3 can have a high scanning speed and can be of the optomechanical type; reference can be made, for example, to the already-mentioned patent application FR 2 568 688. The lens 26 can be of the holographic type, in the form of a plane hologram that includes the equivalent of N diffraction gratings of different pitch so as to reflect N angularly shifted beams from a single incident beam.

The processing unit can include circuits 31 including themselves, for each detection channel corresponding to each photodetector D1 to D4, a device for spectral analysis of the signal, for examples bank of filters or, preferably, a spectrum analyzer of the acousto-optical type or using surface acoustic waves, so as to measure in each point the Doppler shift FD. The remaining processing circuits are designed for the measurement of the amplitude of the signal received by each of the photodetectors, and the corresponding distance, so as to locate the optical spot on the linear array 22. These circuits also perform a weighting to increase the precision of the measurement of the distance D when the optical spot overlaps two successive photodetectors. The display device 24 can be used to display the various measured informations: distance and amplitude of the video signal and Doppler velocity for each point of the observed field. This information can also be used externally by a system 32 that can, for example, perform an automatic extraction to generate alarm signals intended to warn the operator of the presence of an obstacle or a moving object in the observed field.

FIG. 8 illustrates an embodiment of the receiver. The processing unit 31 of FIG. 7 is detailed downstream of the delay lines 30-1 to 30-2. There can be seen for each channel a spectrum analyzer circuit 33-1 to 33-4 connected to the output of the corresponding delay line and followed by an amplitude measuring circuit 35-1 to 35-4. The spectrum analyzer measures in each channel the Doppler shift FD of the signal present in this channel. It is a fast spectrum analyzer that can be built with dispersive delay lines. As an indication, the analysis of a spectral band of about 10 to 100 megahertz can be performed in a time between 5 and 30 microseconds. The amplitude measurement is carried out before the spectrum analyzer, therefore on a signal with a limited spectrum, instead of measuring the signal from the delay lines. The output signals from the amplitude measuring circuits 35 are then applied to a circuit 36 for distance identification through detection of the channel delivering the highest-level signal. As a matter of fact, this channel is that which includes the useful signal and we have seen that each of the channels corresponds to a predetermined distance increment. The distance information D is applied to the output circuits 39 with the other two informations, i.e., the Doppler shift FD and the amplitude AMP. For these last two informations, the corresponding values are selected in circuits 37 and 38 that receive permanently the output signals from the four spectrum analyzers for the Doppler selection circuit 37 and from the four amplitude measuring circuits for the amplitude selection circuit 38, the channel information being given directly by the distance parameter D applied to its input. The output circuit 39 produces the necessary adaptation of the signals depending on the desired representation on the display monitor 24. As an example, the monitor 24 can be a color monitor and it is then possible to represent the image of the observed field as a function of the amplitude information and, with the remaining two colors, it is possible to represent the Doppler shift, of the distance, as a function of a chosen criterion, a limit value, etc.

We claim:

1. A laser imaging system, comprising:
   a laser illuminator to transmit a light beam along a pointing direction;
   a receiver with a detecting device to detect, along the corresponding reception direction, the laser radiation returned by the illuminated objects;
   a device for separation of channels and for scanning to direct the backscattered radiation toward said detecting device and to move in angular rotation said transmission beam so as to scan a predetermined field; and
   a device for displaying the detected image corresponding to said field, wherein said detecting device includes a linear array of N juxtaposed elements oriented in the scanning direction and associated with a focusing lens so as to detect the objects in an overall distance interval comprising N successive elemental intervals, the rank of an element identifying a corresponding elemental interval;
   said receiver including an electronic circuit receiving the N detection channels and equipped with circuits for identification of distance through the rank of the detection channel, as well as compensation circuits for the time shift exhibited by the video signals as a function of said distance so as to bring the illuminated objects back to their angular location for the display of the observed field.

2. A system according to claim 1, further including means for coherent detection including means for beating received flux with a laser wave delivered by a local oscillator, wherein said local beating laser wave is applied to an optical unit allowing to illuminate simultaneously the N photodetectors elements from this local laser wave.

3. A system according to claim 2, wherein said optical unit includes an optical channel multiplying lens associated with a partially transparent mirror.

4. A system according to claim 3, wherein said optical channel multiplying lens is of holographic type.

5. A system according to claim 1, wherein said time shift compensation circuits comprise delay circuits inserted in the N reception channels, respectively, the photodetector element closest to the reception optical axis being equipped with the delay circuit exhibiting the greatest delay, corresponding to the detection at the maximum range of the system.

6. A system according to claim 5, further comprising processing circuits coupled to said delay circuits, said processing circuits including, in series for each channel, a spectrum analyzer circuit followed by an amplitude measuring circuit whose N output signals are applied to a distance identification circuit through detection of the highest-level signal, the N output signals of the spectrum analyzer circuits being applied to a Doppler selection circuit, while the N output signals of the amplitude measuring circuit are applied to an amplitude selection circuit, said amplitude and Doppler selection circuits being controlled from a distance information obtained from said distance identification circuit, the Doppler shift, amplitude and distance information being applied to an output and matching circuit connected to said display device in the form of a color video monitor.

7. A system according to claim 1, wherein said time shift compensation circuits comprise an image memory in which the addressing of the points is shifted in the direction of the line scanning so as to correct the error on the perceived direction of the points of the image, said error being a function of their distance to the imager.

* * * * *

UNITED STATES PATENT AND TRADEMARK OFFICE
CERTIFICATE OF CORRECTION

PATENT NO. : 5,485,009
DATED : January 16, 1996
INVENTOR(S) : MEYZONNETTE et al

It is certified that error appears in the above-indentified patent and that said Letters Patent is hereby corrected as shown below:

On the title page, under item [19], correct the inventor's name to --MEYZONNETTE--;

On the title page, item [75] should read as follows:

[75] Inventors: Jean L. Meyzonnette, Jouy en Josas; Bertrand Remy, Meudon La Foret, both of France Signed and Sealed this Third Day of September, 1996

Attest:

BRUCE LEHMAN

Attesting Officer

Commissioner of Patents and Trademarks